United States Patent
Ono et al.

(10) Patent No.: US 9,832,348 B2
(45) Date of Patent: Nov. 28, 2017

(54) APPARATUS, PROGRAM, AND METHOD FOR CORRECTING GENERATED RECORDING DATA BASED UPON TRANSPARENCY INFORMATION

(71) Applicant: SEIKO EPSON CORPORATION, Tokyo (JP)

(72) Inventors: Takuya Ono, Matsumoto (JP); Tatsuo Akasaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/473,474

(22) Filed: Aug. 29, 2014

(65) Prior Publication Data

US 2015/0062654 A1  Mar. 5, 2015

(30) Foreign Application Priority Data

Aug. 30, 2013 (JP) ................................. 2013-179108

(51) Int. Cl.
  *H04N 1/54* (2006.01)
  *B41J 2/21* (2006.01)
  *G06T 1/00* (2006.01)

(52) U.S. Cl.
  CPC .............. *H04N 1/54* (2013.01); *B41J 2/2114* (2013.01); *B41J 2/2117* (2013.01); *G06T 1/0007* (2013.01)

(58) Field of Classification Search
  None
  See application file for complete search history.

(56) References Cited

U.S. PATENT DOCUMENTS

| | | | |
|---|---|---|---|
| 6,312,101 B1 * | 11/2001 | Couwenhoven ... | H04N 1/40087 347/15 |
| 7,583,421 B2 * | 9/2009 | Watanabe ................ | H04N 1/54 347/103 |
| 8,411,101 B2 * | 4/2013 | Watanabe ..................... | 345/589 |
| 8,498,018 B2 * | 7/2013 | Doggett ................... | H04N 1/54 347/15 |
| 9,036,227 B2 * | 5/2015 | Maheshwari .......... | G06K 15/02 358/1.9 |
| 2007/0201062 A1 | 8/2007 | Watanabe | |
| 2007/0216920 A1 | 9/2007 | Watanabe | |

FOREIGN PATENT DOCUMENTS

| | | |
|---|---|---|
| JP | 2007-228316 | 9/2007 |
| JP | 2007-282205 | 10/2007 |
| JP | 2010-519603 A | 6/2010 |
| JP | 2013-156774 A | 8/2013 |

OTHER PUBLICATIONS

Machine translation of Japanese Pat. Publ. No. 2005-262553 to Hoshino, published Sep. 2005.*

* cited by examiner

*Primary Examiner* — Paul F Payer
(74) *Attorney, Agent, or Firm* — Workman Nydegger

(57) ABSTRACT

A recording data generation apparatus is provided that generates recording data in CMYK form including color information related to CMYK values and color information other than the CMYK values based on image data in RGB form including color information related to RGB values and transparency information related to transparency degree.

8 Claims, 12 Drawing Sheets

| R | G | B | X | C | M | Y | K | W |
|---|---|---|---|---|---|---|---|---|
| 255 | 255 | 255 | 255 | 0 | 0 | 0 | 0 | 255 |
| 128 | 128 | 128 | 255 | 0 | 0 | 0 | 128 | 128 |
| 64 | 64 | 64 | 255 | 0 | 0 | 0 | 191 | 96 |
| 0 | 0 | 0 | 255 | 0 | 0 | 0 | 255 | 0 |
| 255 | 255 | 255 | 128 | 0 | 0 | 0 | 0 | 128 |
| 255 | 255 | 255 | 64 | 0 | 0 | 0 | 0 | 64 |
| 255 | 255 | 255 | 0 | 0 | 0 | 0 | 0 | 0 |
| 128 | 128 | 128 | 128 | 0 | 0 | 0 | 64 | 64 |
| 128 | 128 | 128 | 64 | 0 | 0 | 0 | 32 | 32 |
| 128 | 128 | 128 | 0 | 0 | 0 | 0 | 0 | 0 |
| 255 | 0 | 0 | 255 | 0 | 255 | 255 | 0 | 128 |
| 255 | 0 | 0 | 128 | 0 | 128 | 128 | 0 | 64 |
| 255 | 0 | 0 | 64 | 0 | 64 | 64 | 0 | 32 |
| 255 | 0 | 0 | 0 | 0 | 0 | 0 | 0 | 0 |

FIG. 8

| R | G | B | C | M | Y | K | W |
|---|---|---|---|---|---|---|---|
| 255 | 255 | 255 | 0 | 0 | 0 | 0 | 255 |
| 128 | 128 | 128 | 0 | 0 | 0 | 128 | 128 |
| 64 | 64 | 64 | 0 | 0 | 0 | 191 | 96 |
| 0 | 0 | 0 | 0 | 0 | 0 | 255 | 0 |
| 255 | 0 | 0 | 0 | 255 | 255 | 0 | 128 |
| 0 | 255 | 0 | 160 | | 255 | 0 | 160 |
| 0 | 0 | 255 | 255 | 191 | 0 | 0 | 160 |
| 255 | 255 | 0 | 16 | 0 | 255 | 0 | 223 |
| 0 | 255 | 255 | 128 | 0 | 32 | 0 | 191 |
| 255 | 0 | 255 | 96 | 223 | 0 | 0 | 160 |

FIG. 9C
| C | M | Y | K | W |
|---|---|---|---|---|
| 0 | 0 | 0 | 0 | 255 |
| 0 | 0 | 0 | 128 | 128 |
| 0 | 0 | 0 | 191 | 96 |
| 0 | 0 | 0 | 255 | 0 |
| 0 | 0 | 0 | 0 | 128 |
| 0 | 0 | 0 | 0 | 64 |
| 0 | 0 | 0 | 0 | 0 |
| 0 | 0 | 0 | 64 | 64 |
| 0 | 0 | 0 | 32 | 32 |
| 0 | 0 | 0 | 0 | 0 |
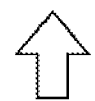
FIG. 9B
| C | M | Y | K | W |
|---|---|---|---|---|
| 0 | 0 | 0 | 0 | 255 |
| 0 | 0 | 0 | 128 | 128 |
| 0 | 0 | 0 | 191 | 96 |
| 0 | 0 | 0 | 255 | 0 |
| 0 | 0 | 0 | 0 | 255 |
| 0 | 0 | 0 | 0 | 255 |
| 0 | 0 | 0 | 0 | 255 |
| 0 | 0 | 0 | 128 | 128 |
| 0 | 0 | 0 | 128 | 128 |
| 0 | 0 | 0 | 128 | 128 |
FIG. 9A
| R | G | B | X |
|---|---|---|---|
| 255 | 255 | 255 | 255 |
| 128 | 128 | 128 | 255 |
| 64 | 64 | 64 | 255 |
| 0 | 0 | 0 | 255 |
| 255 | 255 | 255 | 128 |
| 255 | 255 | 255 | 64 |
| 255 | 255 | 255 | 0 |
| 128 | 128 | 128 | 128 |
| 128 | 128 | 128 | 64 |
| 128 | 128 | 128 | 0 |

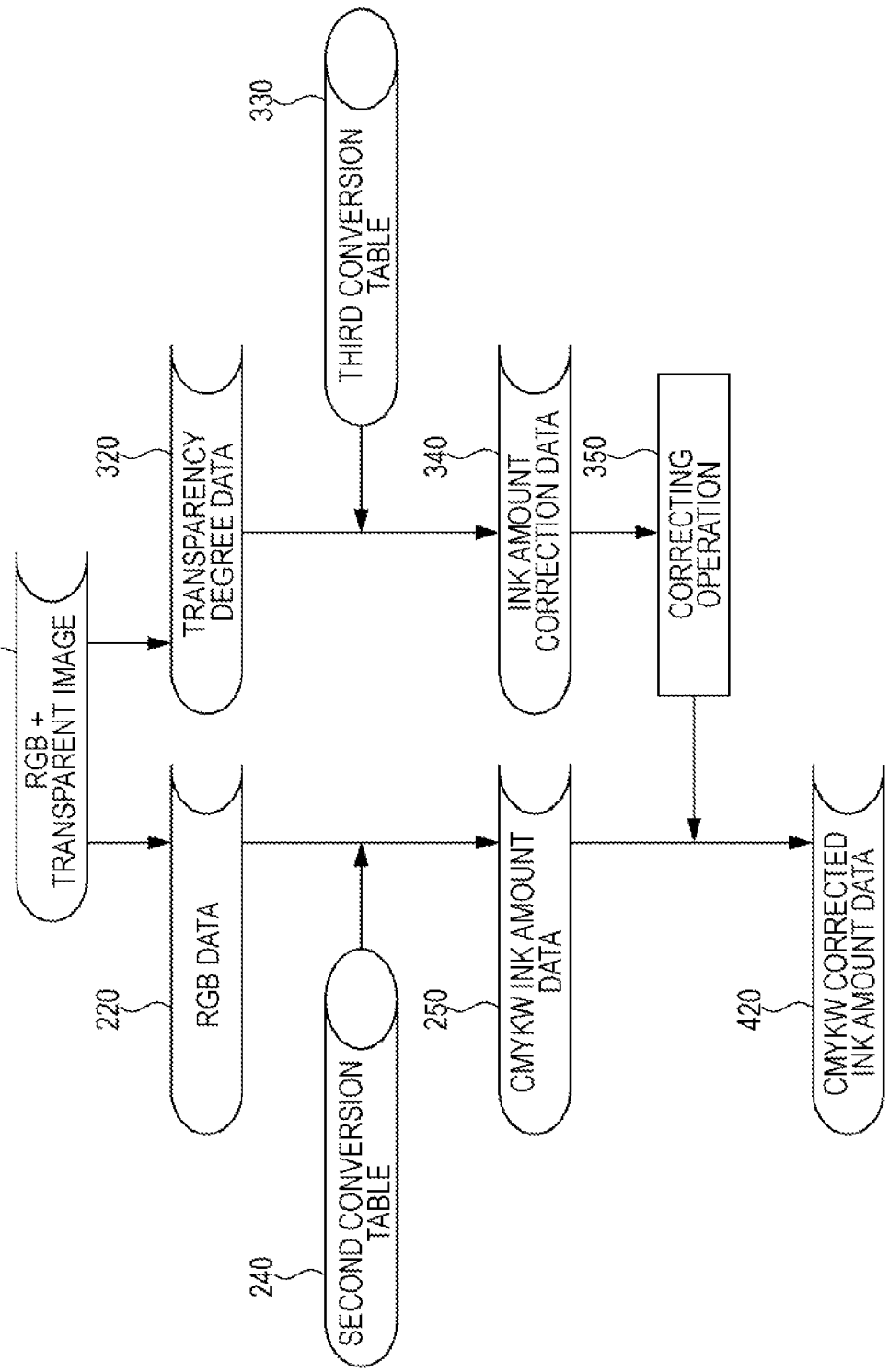

FIG. 11

| X | CMYK | W |
|---|------|-----|
| 255 | 1 | 1 |
| 192 | 0.75 | 0.75 |
| 128 | 0.5 | 0.5 |
| 64 | 0.25 | 0.2 |
| 32 | 0.125 | 0.1 |
| 0 | 0 | 0 |

FIG. 12A
| R | G | B | X |
|---|---|---|---|
| 255 | 255 | 255 | 255 |
| 128 | 128 | 128 | 255 |
| 64 | 64 | 64 | 255 |
| 0 | 0 | 0 | 255 |
| 255 | 255 | 255 | 128 |
| 255 | 255 | 255 | 64 |
| 255 | 255 | 255 | 0 |
| 128 | 128 | 128 | 128 |
| 128 | 128 | 128 | 64 |
| 128 | 128 | 128 | 0 |
FIG. 12B
| C | M | Y | K | W |
|---|---|---|---|---|
| 0 | 0 | 0 | 0 | 255 |
| 0 | 0 | 0 | 128 | 128 |
| 0 | 0 | 0 | 191 | 96 |
| 0 | 0 | 0 | 255 | 0 |
| 0 | 0 | 0 | 0 | 255 |
| 0 | 0 | 0 | 0 | 255 |
| 0 | 0 | 0 | 0 | 255 |
| 0 | 0 | 0 | 128 | 128 |
| 0 | 0 | 0 | 128 | 128 |
| 0 | 0 | 0 | 128 | 128 |
 
FIG. 12C
| CMYK | W |
|---|---|
| 1 | 1 |
| 1 | 1 |
| 1 | 1 |
| 1 | 1 |
| 0.5 | 0.5 |
| 0.25 | 0.2 |
| 0 | 0 |
| 0.5 | 0.5 |
| 0.25 | 0.2 |
| 0 | 0 |
FIG. 12D
| C | M | Y | K | W |
|---|---|---|---|---|
| 0 | 0 | 0 | 0 | 255 |
| 0 | 0 | 0 | 128 | 128 |
| 0 | 0 | 0 | 191 | 96 |
| 0 | 0 | 0 | 255 | 0 |
| 0 | 0 | 0 | 0 | 128 |
| 0 | 0 | 0 | 0 | 51 |
| 0 | 0 | 0 | 0 | 0 |
| 0 | 0 | 0 | 64 | 64 |
| 0 | 0 | 0 | 32 | 25 |
| 0 | 0 | 0 | 0 | 0 |

APPARATUS, PROGRAM, AND METHOD FOR CORRECTING GENERATED RECORDING DATA BASED UPON TRANSPARENCY INFORMATION

BACKGROUND

1. Technical Field

The present invention relates to recording data generation apparatuses, programs, recording data generation methods, and recording apparatuses.

2. Related Art

It has been carried out to generate recording data in CMYK form that is recorded by recording apparatuses based on image data in RGB form that is displayed by display devices.

Further, such recording apparatuses are being used these days that can record a base layer or the like using different types of ink such as white ink or the like, for example, aside from so-called color inks used in forming images.

For example, JP-A-2007-228316 and JP-A-2007-282205 respectively disclose recording data generation apparatuses that perform recoding using color inks and white ink.

However, in the case where recording is performed by a recording apparatus that can record using both so-called color inks used in forming images and other ink different from the color inks (for example, white ink), a desired recording image cannot be easily recorded in some case. For example, in the case where the recording image is configured of an image section and a peripheral section forming the periphery of the image section, it is not easy to prevent the peripheral section from being recorded by the white ink in some case. The reason for this is as follows. That is, because the color of a general recording target medium has mostly been white, in the case where the color of the peripheral section is white, it has been carried out by a general recording data generation apparatus to generate recording data in which the color of the peripheral section is not considered to pass the color of a background image, but considered to be the color set for the recording image. To be more specific, it has been carried out by such known recording data generation apparatus to generate recording data in CMYK form based on image data in RGB form that only has information related to RGB values corresponding to color inks.

The recording data generation apparatus disclosed in JP-A-2007-228316 generates recording data in CMYK form based on image data in RGB form only having information related to RGB values corresponding to color inks. In other words, the disclosed recording data generation apparatus corresponds to the general recording data generation apparatus mentioned above. Accordingly, it has been difficult for the above peripheral section to be protected from recording thereon with the white ink.

Meanwhile, the recording data generation apparatus disclosed in JP-A-2007-282205 generates recording data in CMYK form based on image data in RGB form that has information related to RGB values corresponding to color inks and white image data in RGB form that is different from the stated image data and has information related to RGB values corresponding to white ink. Accordingly, it is possible for the peripheral section to be protected from recording thereon with the white ink by the white image data being generated so as to protect the peripheral section from recording thereon with the white ink. However, the white image data need be prepared separately in addition to the image data, which is time-consuming work.

SUMMARY

An advantage of some aspects of the invention is to provide recording data generation apparatuses, programs, recording data generation methods, and recording apparatuses, thereby making it possible to easily record a desired recording image in the case where recording is performed by a recording apparatus that can record using both so-called color inks used in forming images and other ink different from the color inks.

A recording data generation apparatus according to a first aspect of the invention is an apparatus that generates recording data in CMYK form including color information related to CMYK values and color information other than the CMYK values based on image data in RGB form including color information related to RGB values and transparency information related to transparency degree.

Here, the expression "including color information related to RGB values and transparency information related to transparency degree" may correspond to a case where the image data includes transparency information such as transparency parameters or the like in addition to the information related to RGB values as general color information. If the image data includes the transparency information, not only data representing transparency and translucence but also data at a transparency degree of 0 is included therein.

According to this aspect, the image data includes both the color information related to RGB values and the transparency information related to transparency degree. Based on this image data, recording data in CMYK form is generated which includes color information related to CMYK values and color information other than the CMYK values. It is possible to easily convert the color information related to RGB values and the transparency information related to transparency degree to the color information related to CMYK values and the color information other than the CMYK values using, for example, a conversion table or the like, whereby such recording data can be generated with ease that makes it possible to record a desired recording image.

It is preferable that the color information other than the CMYK values be information related to an amount of ink used in forming a base layer, and the color information related to the CMYK values be information related to an amount of ink used in forming a recording image upon the base layer based on the above-mentioned recording data.

Here, "ink used in forming a base layer" means ink that is capable of forming a base layer. Depending on types or the like of image data, the stated ink may not form the base layer. In addition, the ink may be used in forming both the base layer and the image. As specific examples of the ink used in forming the base layer, white ink, metallic ink, and so on can be cited.

According to this aspect, it is possible to easily generate recording data that causes an amount of ink for the formation of a base layer and an amount of ink for the formation of a recording image upon the base layer based on the above recording data to be sufficient so as to make it possible to record a desired recording image. Accordingly, a desired recording image can be easily recorded by using a recording apparatus capable of forming the base layer.

It is preferable that the recording data generation apparatus include a first conversion table configured to convert the RGB values and the transparency degree to the color information related to the CMYK values and the color information other than the CMYK values in the first or second aspect.

According to this aspect, the apparatus includes the first conversion table configured to convert the RGB values and the transparency degree to the color information related to the CMYK values and the color information other than the CMYK values. This makes it possible to easily convert the color information related to the RGB values and the transparency information related to the transparency degree to the color information related to the CMYK values and the color information other than the CMYK values using the first conversion table. In other words, recording data that makes it possible to record a desired recoding image can be generated with ease.

It is preferable that the recording data generation apparatus include a second conversion table configured to convert the RGB values to color information related to the CMYK values and color information other than the CMYK values, and a formula that is configured to correct, based on the transparency degree, the color information related to the CMYK values and the color information other than the CMYK values obtained through conversion using the stated second conversion table.

According to this aspect, the apparatus includes the second conversion table configured to convert the RGB values to color information related to the CMYK values and color information other than the CMYK values. In addition, the apparatus corrects the color information related to the CMYK values and the color information other than the CMYK values obtained through the conversion using the second conversion table, by using the above formula in accordance with the transparency degree. This makes it possible to easily convert the color information related to the RGB values and the transparency information related to the transparency degree to the color information related to the CMYK values and the color information other than the CMYK values using the second conversion table and the formula. In other words, recording data that makes it possible to record a desired recording image can be generated with ease.

Note that the second conversion table is configured to convert the RGB values to color information related to the CMYK values and color information other than the CMYK values without using the transparency degree. This makes it possible for the second conversion table to be smaller than the first conversion table.

It is preferable that the recording data generation apparatus include the second conversion table configured to convert the RGB values to color information related to the CMYK values and color information other than the CMYK values, and a third conversion table configured to generate correction data based on the transparency degree so as to correct the color information related to the CMYK values and the color information other than the CMYK values obtained through the conversion using the second conversion table.

According to this aspect, the apparatus includes the second conversion table configured to convert the RGB values to color information related to the CMYK values and color information other than the CMYK values. The apparatus further includes the third conversion table configured to generate the correction data in accordance with the transparency degree so as to correct the color information related to the CMYK values and the color information other than the CMYK values obtained through the conversion using the second conversion table. Accordingly, the color information related to the RGB values and the transparency information related to the transparency degree can be easily converted to the color information related to the CMYK values and the color information other than the CMYK values using the second conversion table and the third conversion table. In other words, recording data that makes it possible to record a desired recording image can be generated with ease.

Note that the second conversion table is configured to convert the RGB values to color information related to the CMYK values and color information other than the CMYK values without using the transparency degree. This makes it possible for the second conversion table to be smaller than the first conversion table.

A computer program product according to a further aspect of the invention is a program that causes a recording data generation apparatus to generate recording data in CMYK form including color information related to CMYK values and color information other than the CMYK values based on image data in RGB form including color information related to RGB values and transparency information related to transparency degree.

According to this aspect, because color information related to RGB values and transparency information related to transparency degree can be easily converted to color information related to CMYK values and color information other than the CMYK values by using, for example, a conversion table or the like, it is possible for the program to easily cause the recording data generation apparatus to generate recording data with which a desired recording image can be recorded.

A recording data generation method according to a still further aspect of the invention is a method that generates recording data in CMYK form including color information related to CMYK values and color information other than the CMYK values based on image data in RGB form including color information related to RGB values and transparency information related to transparency degree.

According to this aspect, because color information related to RGB values and transparency information related to transparency degree can be easily converted to color information related to CMYK values and color information other than the CMYK values by using, for example, a conversion table or the like, it is possible for the method to easily generate recording data with which a desired recording image can be recorded.

A recording apparatus is an apparatus that is connected with the recording data generation apparatus according to any one of aspects of the invention.

According to this aspect, it is possible for the recording apparatus to perform recording while being connected with the recording data generation apparatus in which color information related to RGB values and transparency information related to transparency degree can be easily converted to color information related to CMYK values and color information other than the CMYK values by using, for example, a conversion table or the like.

BRIEF DESCRIPTION OF THE DRAWINGS

The invention will be described with reference to the accompanying drawings, wherein like numbers reference like elements.

FIG. 8 is a second conversion table that is used in the recording data generation process according to the second example of the invention and is also used in a recording data generation process according to a third example of the invention.

FIGS. 9A through 9C are diagrams illustrating respective values of information corresponding to the recording data generation process according to the second example of the invention.

FIG. 10 is a data transition diagram of a recording data generation process according to a third example of the invention.

FIG. 11 is a third conversion table that is used in the recording data generation process according to the third example of the invention.

FIGS. 12A through 12D are diagrams illustrating respective values of information corresponding to the recording data generation process according to the third example of the invention.

DESCRIPTION OF EXEMPLARY EMBODIMENTS

Hereinafter, a recording data generation apparatus according to an embodiment of the invention will be described in detail with reference to the appended drawings.

The recording data generation apparatus of this embodiment will be described below exemplifying a personal computer (PC) that is connected with a recording apparatus of this embodiment and is capable of generation of recoding data to be recorded in the stated recording apparatus.

First, a recording apparatus 1 of this embodiment will be described. Note that a PC 17 (see FIG. 3) as the recording data generation apparatus of this embodiment is connected with the stated recording apparatus 1.

Figure 1:
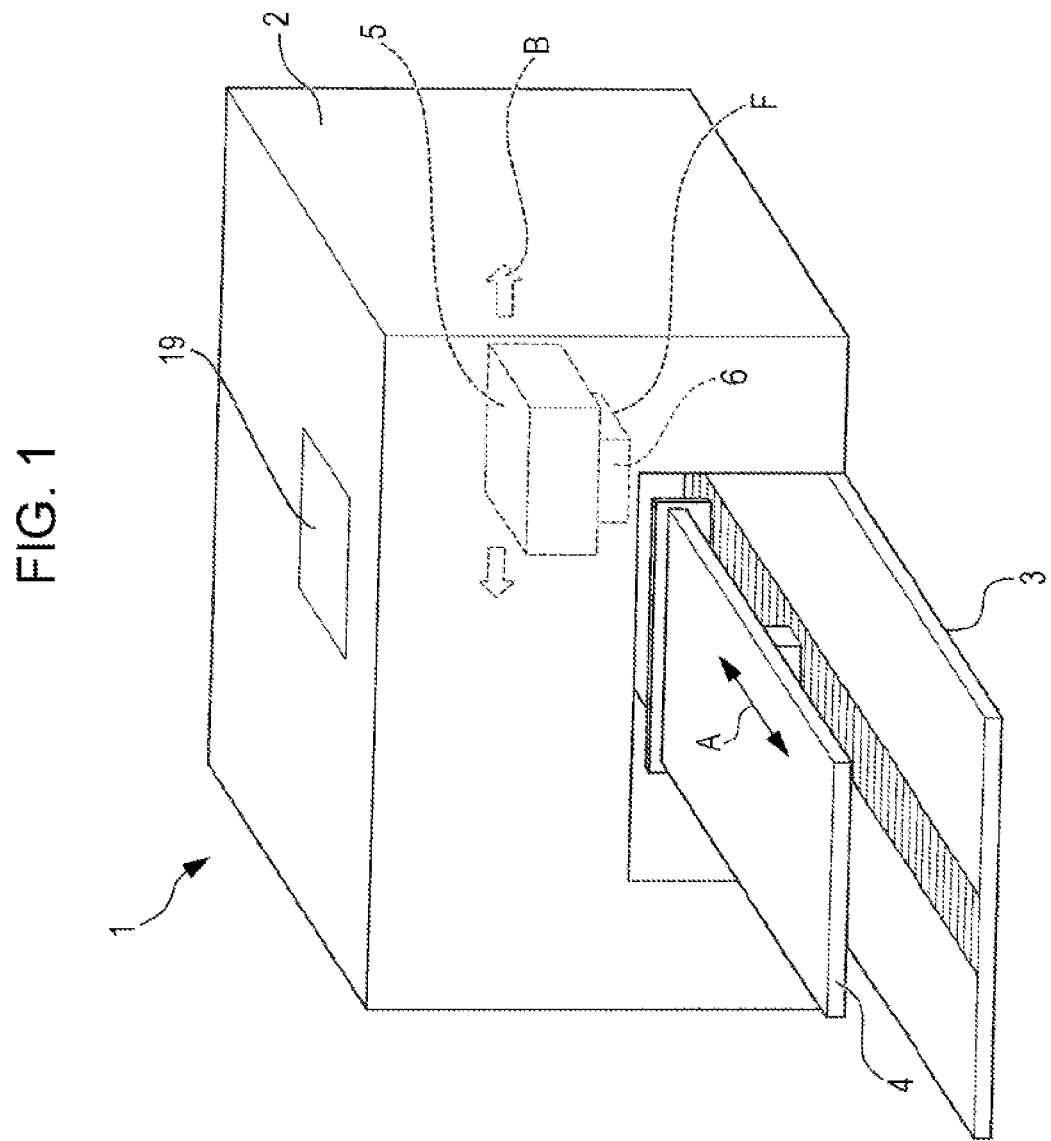
FIG. 1 is a schematic perspective view illustrating a recording apparatus according to an embodiment of the invention.

FIG. 1 is a schematic perspective view of the recording apparatus 1 of this embodiment.

The recording apparatus 1, as shown in FIG. 1, includes a medium support unit 4. A transport unit 3 transports a recording target medium by moving the medium support unit 4 in a transport direction A.

An apparatus main body 2 is provided with a recording head 6. The recording apparatus 1 forms a desired image by causing ink to be discharged onto the recording target medium from an ink discharge face F of the record head 6 while moving the recording head 6 back and forth via a carriage 5 in a scanning direction B that intersects with the transport direction A.

Note that the recording apparatus 1 can record using white ink for formation of a base layer and color inks (black ink, cyan ink, magenta ink, and yellow ink) for formation of an image.

However, the invention is not intended to be limited to this configuration; for example, metallic ink can be used as the ink for the formation of a base layer and color inks other than the above color inks can be used as the color inks for the formation of an image.

Further, the recording apparatus 1 includes a touch panel 19 capable of displaying a preview screen of a recording image or the like.

Next, an electric configuration of the recording apparatus 1 of this embodiment will be described.

Figure 2:
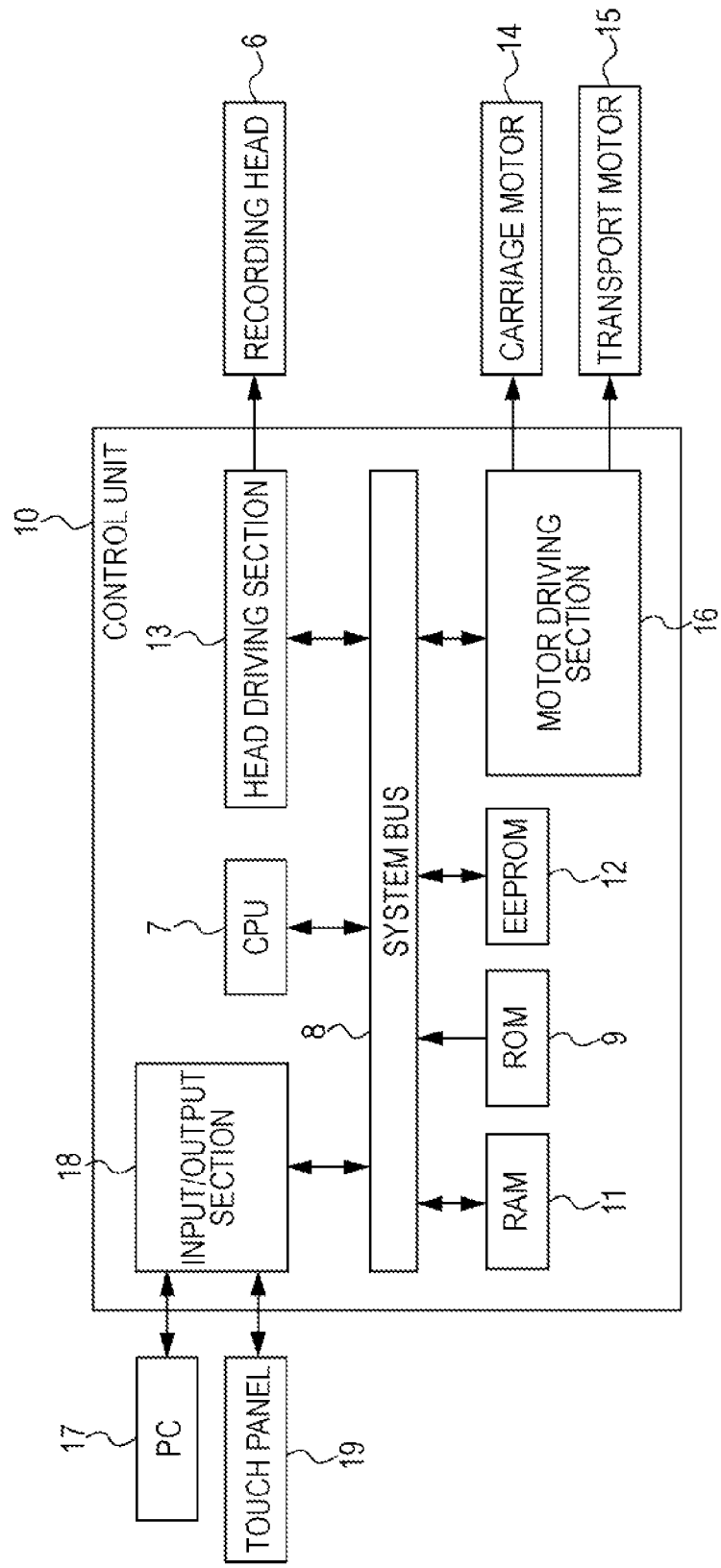
FIG. 2 is a block diagram of a recording apparatus according to an embodiment of the invention.

FIG. 2 is a block diagram of the recording apparatus 1 of this embodiment.

A control unit 10 is provided with a CPU 7 in charge of the overall control of the recording apparatus 1. The CPU 7 is connected with, via a system bus 8, a ROM 9 in which stored are various control programs, a maintenance sequence, and the like to be executed by the CPU 7, a RAM 11 in which data can be temporarily stored, and an EEPROM 12, which is a nonvolatile memory.

Further, the CPU 7 is connected with, via the system bus 8, a head driving section 13 configured to drive the recording head 6.

Furthermore, the CPU 7 is connected with, via the system bus 8, a motor driving section 16 configured to drive a carriage motor 14 for moving the carriage 5 and a transport motor 15 provided in the transport unit 3 for transporting the recording target medium.

In addition, the CPU 7 is connected with an input/output section 18 via the system bus 8; the input/output section 18 is connected with the touch panel 19 and the PC 17 as the recording data generation apparatus of this embodiment.

According to the recording apparatus 1 of this embodiment, the apparatus can record while being connected with the recording data generation apparatus in which color information related to RGB values and transparency information related to transparency degree can be easily converted to color information related to CMYK values and color information other than the CMYK values by using, for example, a conversion table or the like.

Next, the recording data generation apparatus (PC 17) according to the embodiment of the invention will be described.

Figure 3:
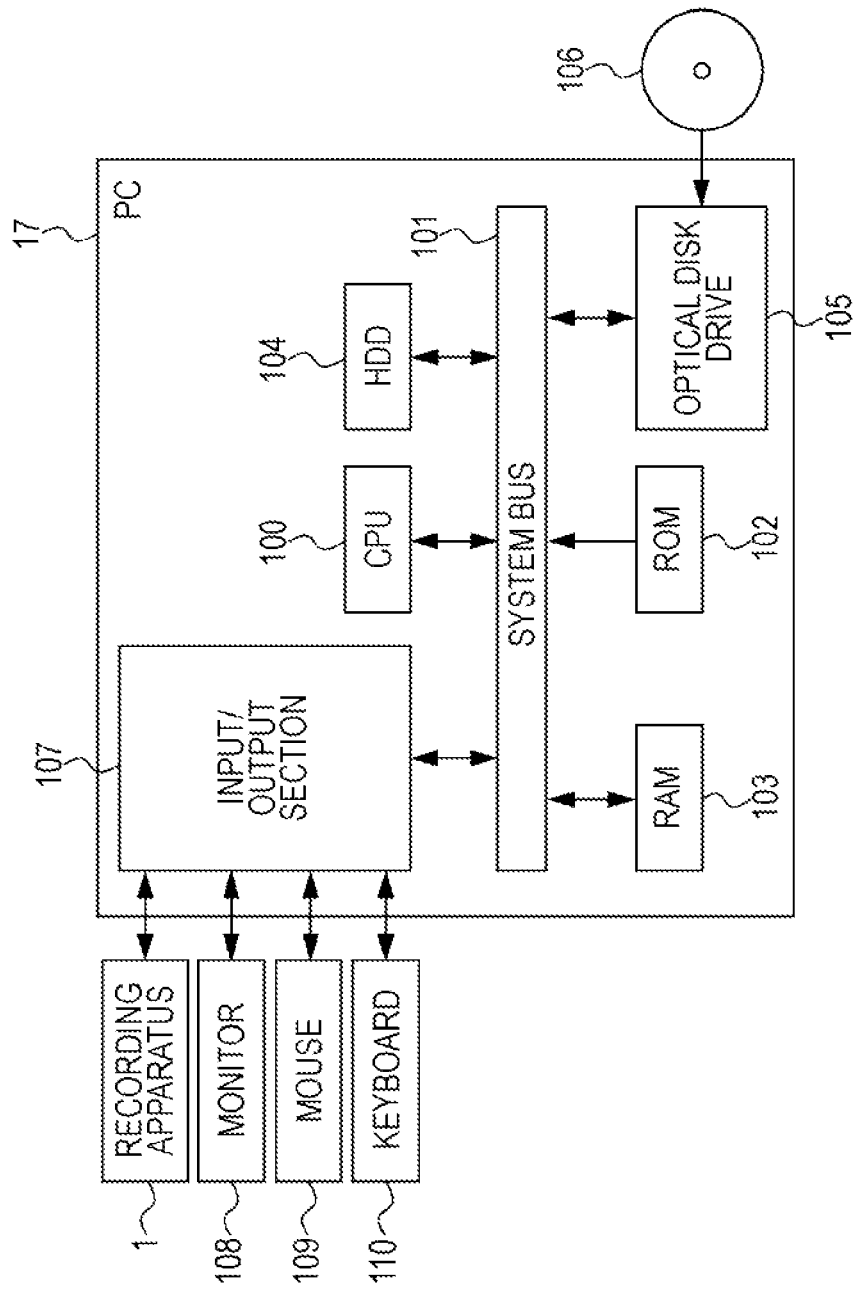
FIG. 3 is a block diagram of a recording data generation apparatus according to an embodiment of the invention.

FIG. 3 is a block diagram of the PC 17 as the recording data generation apparatus according to the embodiment of the invention.

The PC 17 is provided with a CPU 100 in charge of the overall control of the PC 17. The CPU 100 is connected with, via a system bus 101, a ROM 102 in which stored are various programs such as BIOS and the like to be executed by the CPU 100, a RAM 103 in which data can be temporarily stored, and an HDD 104 as a data storage unit. Note that in the ROM 102, stored are a first conversion table, a second conversion table, a third conversion table and the like, which will be explained later in detail.

Further, the CPU 100 is connected with, via the system bus 101, an optical disk drive 105 into which an optical disk 106 such as a CD, DVD, or the like is inserted. The optical disk drive 105 can read/write data from/onto the optical disk 106.

Furthermore, the CPU 100 is connected with an input/output section 107 via the system bus 101. The input/output section 107 is connected with the recording apparatus 1, a monitor 108, a mouse 109, and a keyboard 110.

The PC 17 can generate recording data in CMYK form including color information related to CMYK values and color information other than the CMYK values based on image data in RGB form including color information related to RGB values and transparency information related to transparency degree.

Here, the expression "including color information related to RGB values and transparency information related to transparency degree" may correspond to a case where the image data includes transparency information such as transparency parameters or the like in addition to the information related to RGB values as general color information. If the image data includes the transparency information, not only data representing transparency or translucence but also data at a transparency degree of 0 is included therein.

The PC 17 of this embodiment generates recording data in CMYK form including color information related to CMYK values and color information other than the CMYK values based on image data including both color information related to RGB values and transparency information related to transparency degree. As described later, the PC 17 can easily generate recording data with which a desired recording image can be recorded because color information related to RGB values and transparency information related to the transparency degree can be easily converted to color information related to CMYK values and color information other than the CMYK values by using, for example, a conversion table or the like.

In this embodiment, the information of white ink that is used in forming a base layer is taken as color information other than the CMYK values. However, color information other than the CMYK values is not intended to be limited to the information of such ink, and may be information related to an amount of color ink, capable of having color information other than the CMYK values, such as white ink, metallic ink, or the like that is used not only in forming a base layer but also in forming an image together with other color inks, for example.

An example is described hereinafter in which image data including color information related to RGB values and transparency information related to transparency degree is displayed as a preview screen in the touch panel 19; this image data is used in the case where the recording is performed by a recording apparatus employing such white ink that is used in forming images together with other color inks.

Figure 13:
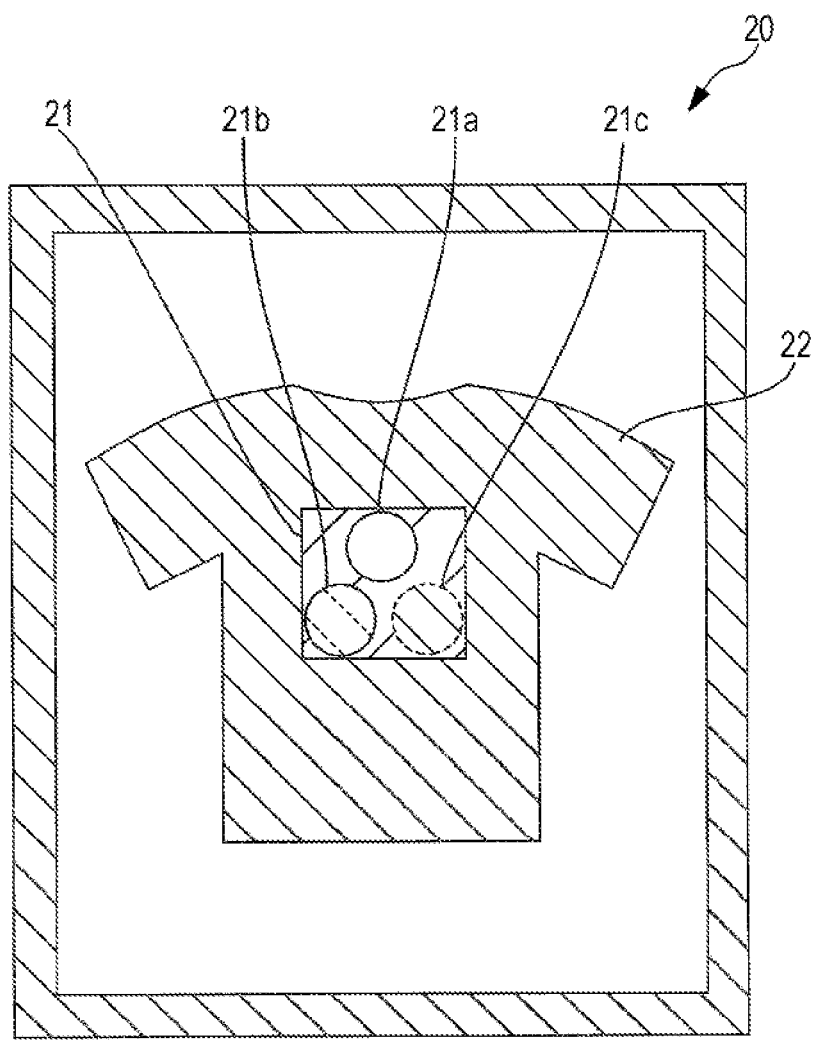
FIG. 13 is a diagram illustrating a preview screen displayed in a touch panel.

FIG. 13 is a diagram illustrating a preview screen 20 displayed in the touch panel 19.

FIG. 13 illustrates the preview screen 20 in which an image 21 including a white image 21a, a translucent white image 21b, and a transparent image 21c is depicted on a T-shirt 22 as a recording target medium. In other words, FIG. 13 illustrates a state in which, based on image data including color information related to RGB values and transparency information related to transparency degree, the image 21 corresponding to the above image data is displayed in the touch panel 19.

As shown in FIG. 13, since the image data includes the color information related to RGB values and the transparency information related to transparency degree, the image 21 is displayed in the preview screen 20 in a state in which the white image 21a, the translucent white image 21b, and the transparent image 21c can be clearly recognized.

In this embodiment, the color information other than the CMYK values refers to information related to the amount of ink (white ink in this embodiment) used in forming a base layer, while the color information related to the CMYK values refers to information related to the amount of ink used in forming a recording image upon the base layer based on the recording data.

Here, "ink used in forming a base layer" refers to ink that is capable of forming a base layer. Note that there may be a case in which the stated ink does not form the base layer depending on types of image data or the like. In addition, the ink may aim at both forming the base layer and forming the image. As specific examples of the ink used in forming the base layer, metallic ink and the like can be cited aside from white ink.

The PC 17 of this embodiment can easily generate recording data in which the amount of white ink used in forming a base layer and the amount of ink used in forming a recording image upon the base layer based on the recording data are respectively allowed to have the values making it possible to record a desired recording image. Accordingly, recording of a desired recording image can be obtained with ease, using the recording apparatus 1 capable of forming a base layer with white ink.

Instead of the PC 17 of this embodiment, a program as follows may be used as the program of this invention. That is, the stated program causes the recording data generation apparatus to generate recording data in CMYK form including color information related to CMYK values and color information other than the CMYK values based on image data in RGB form including color information related to RGB values and transparency information related to transparency degree.

The reason for this is as follows. That is, because such program can easily convert color information related to RGB values and transparency information related to transparency degree to color information related to CMYK values and color information other than the CMYK values by using, for example, a conversion table or the like, it is possible to easily cause the recording data generation apparatus to generate recording data with which a desired recording image can be recorded.

Contents of the PC 17 of this embodiment and contents of recording data generation processes of later-explained examples that are described in this specification as the features thereof may be added in the stated program as needed.

Further, such a recording data generation method may be employed as the recording data generation method of this invention that generates recording data in CMYK form including color information related to CMYK values and color information other than the CMYK values based on image data in RGB form including color information related to RGB values and transparency information related to transparency degree.

Such recording data generation method can easily convert color information related to RGB values and transparency information related to transparency degree to color information related to CMYK values and color information other than the CMYK values by using, for example, a conversion table or the like. Accordingly, it is possible to easily generate recording data with which a desired recording image can be recorded.

Contents of the PC 17 of this embodiment and contents of recording data generation processes of later-explained examples that are described in this specification as the features thereof may be added in the stated recording data generation method as needed.

Next, recording data generation processes will be described in detail based on some examples.

First Example

Figures 4, 5:
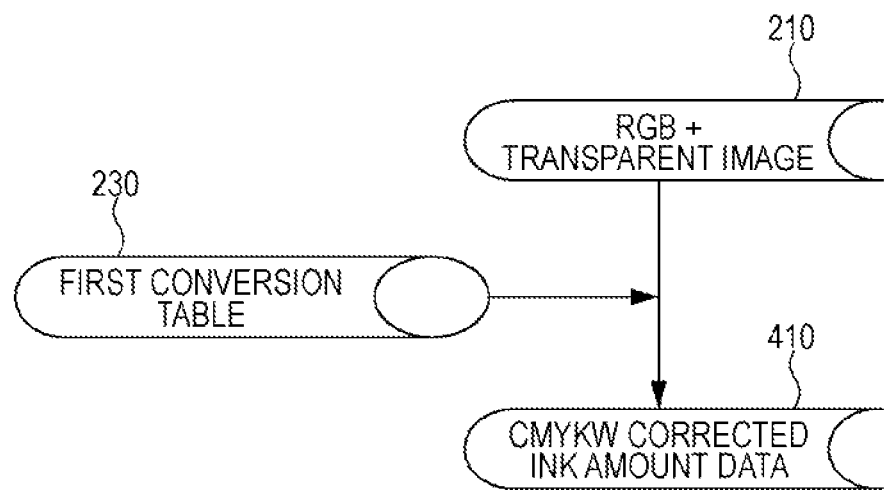
FIG. 4 is a data transition diagram of a recording data generation process according to a first example of the invention.
FIG. 5 is a first conversion table that is used in the recording data generation process according to the first example of the invention.
Figure 6:
FIGS. 6A and 6B are diagrams illustrating respective values of information corresponding to the recording data generation process according to the first example of the invention.

FIG. 4 is a data transition diagram of a recording data generation process according to a first example of the invention. FIG. 5 is a first conversion table that is used in the recording data generation process according to the first example of the invention. FIGS. 6A and 6B are diagrams illustrating respective values of information corresponding to the recording data generation process according to the first example of the invention.

As shown in FIG. 4, in this example, recording data in CMYK form (CMYKW corrected ink amount data 410) including color information related to CMYK values and color information other than the CMYK values is generated based on image data in RGB form (RGB+transparent image 210) including color information related to RGB values and transparency information related to a transparency degree X. In this case, a first conversion table 230 (see FIG. 5) is used in which the RGB values and the transparency degree X are converted to the color information related to the CMYK values and the color information of white (W) as the color information other than the CMYK values.

FIG. 6A indicates respective RGB values, expressed in 256 gradations ranging from 0 to 255, of the color information related to the RGB values and values of the transparency degree X, expressed in 256 gradations ranging from 0 to 255, of the transparency information related to the transparency degree X, with respect to the image data in this example (RGB+transparent image 210 in FIG. 4).

More specifically, the first to fourth rows from top, indicated by "U", represent gradations changing from white toward black as it progresses from the first row toward the fourth row. The fifth to seventh rows from top, indicated by "M", represent gradations changing from white toward transparency as it progresses from the fifth row toward the seventh row. The eighth to tenth rows from top, indicated by "L", represent gradations changing from gray toward transparency as it progresses from the eighth row toward the tenth row.

FIG. 6B indicates respective CMYK values, expressed in 256 gradations ranging from 0 to 255, of the color information related to the CMYK values and W values, expressed in 256 gradations ranging from 0 to 255, of the color information of the white (W) as the color information other than the CMYK values.

More specifically, the first to fourth rows from top, indicated by "U", represent a state in which the amount of black ink increases and the amount of white ink decreases as it progresses from the first row toward the fourth row. The fifth to seventh rows from top, indicated by "M", represent a state in which the amount of white ink decreases as it progresses from the fifth row toward the seventh row. The eighth to tenth rows from top, indicated by "L", represent a state in which both the amount of black ink and the amount of white ink decrease as it progresses from the eighth row toward the tenth row.

Note that the first conversion table 230 shown in FIG. 5 is used when the recording data of this example as shown in FIG. 6B is generated from the image data of this example as shown in FIG. 6A.

According to this example, the color information related to RGB values and the transparency information related to transparency degree can be easily converted to the color information related to CMYK values and the color information other than the CMYK values using the first conversion table. That is, recording data that makes it possible to record a desired recording image can be easily generated.

Second Example

Figure 7:
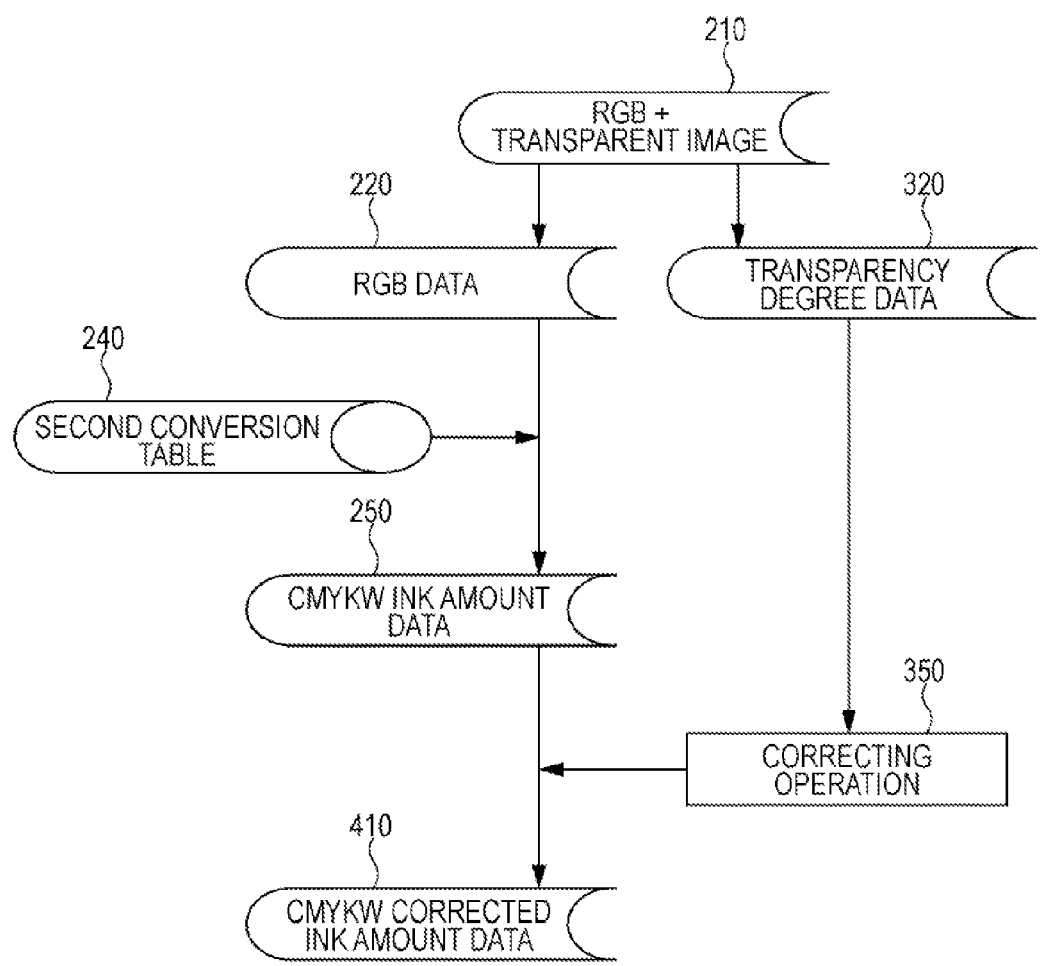
FIG. 7 is a data transition diagram of a recording data generation process according to a second example of the invention.

FIG. 7 is a data transition diagram of a recording data generation process according to a second example of the invention. FIG. 8 is a second conversion table that is used in the recording data generation process according to the second example of the invention. FIGS. 9A through 9C are diagrams illustrating respective values of information corresponding to the recording data generation process according to the second example of the invention.

As shown in FIG. 7, in this example, recording data in CMYK form (CMYKW corrected ink amount data 410) including color information related to CMYK values and color information other than the CMYK values is generated based on image data in RGB form (RGB+transparent image 210) including color information related to RGB values and transparency information related to the transparency degree X. In this case, a second conversion table 240 (see FIG. 8) is used in which the RGB values (RGB data 220) is converted to color information related to the CMYK values and color information of W as the color information other than the CMYK values (CMYKW ink amount data 250). Further, in accordance with the transparency degree X (transparency degree data 320), the color information related to the CMYK values and color information of W as the color information other than the CMYK values obtained through the conversion using the second conversion table are corrected using a formula stored in the ROM 102 (correcting operation 350). To be more specific, the correcting operation 350 is carried out in a manner such that the CMYKW ink amount data 250 is multiplied by resultant values each obtained through a calculation in which each value of the transparency degree X (value of the transparency degree X in FIG. 9A) is divided by 255.

The above calculation processing can be expressed by the following formula. That is;

$$CMYKW \text{ corrected ink amount data } 410 = CMYKW \text{ ink amount data } 250 \times (\text{transparency degree data } 320/255)$$

The image data of this example shown in FIG. 9A (RGB+transparent image 210) is the same as the image data of the first example shown in FIG. 6A (RGB+transparent image 210). Therefore, detailed description thereof is omitted herein.

Further, the recording data of this example shown in FIG. 9C (CMYKW corrected ink amount data 410) is the same as the recording data of the first example shown in FIG. 6B (CMYKW corrected ink amount data 410). Therefore, detailed description thereof is omitted herein.

In the case where the recording data of this example shown in FIG. 9C is generated from the image data of this example shown in FIG. 9A, the second conversion table 240 shown in FIG. 8 and the above-described formula are used. Note that the second conversion table 240 shown in FIG. 8 is the same as the conversion table used when recording data in CMYK form is generated from image data in RGB form with respect to a recording target medium having a conventional background color of white. Accordingly, using the conventional table reduces a burdensome work of newly generating the second conversion table 240.

Specifically, first, the CMYKW ink amount data 250 shown in FIG. 9B is generated from the RGB data 220 included in the image data of this example shown in FIG. 9A, using the second conversion table 240. Next, the CMYKW ink amount data 250 generated in this manner is corrected through the correcting operation 350 using the above formula, and consequently the CMYKW corrected ink amount data 410 is generated.

According to this example, color information related to RGB values and transparency information related to transparency degree can be easily converted to color information related to CMYK values and color information other than the CMYK values by using the above second conversion table and the formula. That is, recording data that makes it possible to record a desired recording image can be easily generated.

Note that the second conversion table is configured to convert the RGB values to the color information related to the CMYK values and the color information other than the CMYK values without using the transparency degree. This makes it possible for the second conversion table to be smaller than the first conversion table.

Third Example

FIG. 10 is a data transition diagram of a recording data generation process according to a third example of the invention. FIG. 11 is a third conversion table that is used in the recording data generation process according to the third example of the invention. FIGS. 12A through 12D are diagrams illustrating respective values of information corresponding to the recording data generation process according to the third example of the invention.

In this example, as shown in FIG. 10, based on image data in RGB form (RGB+transparent image 210) including color information related to RGB values and transparency information related to the transparency degree X, recording data in CMYK form (CMYKW corrected ink amount data 420) including color information related to CMYK values and color information other than the CMYK values is generated. In this case, the second conversion table 240 (see FIG. 8) is used in which the RGB values (RGB data 220) is converted to the color information related to the CMYK values and the color information of W (CMYKW ink amount data 250); note that "W" is a color other than the CMYK values. Further, in accordance with the transparency degree X (transparency degree data 320), ink amount correction data 340 is generated using a third conversion table 330 (see FIG. 11) to correct the color information related to the CMYK values and the color information of W as the color other than the CMYK values obtained through the conversion using the second conversion table 240. Subsequently, the color information related to the CMYK values and the color information of W as the color other than the CMYK values obtained through the conversion using the second conversion table 240, are corrected using the ink amount correction data 340 (correcting operation 350).

The image data of this example shown in FIG. 12A (RGB+transparent image 210) is the same as the image data of the first example shown in FIG. 6A (RGB+transparent image 210) and the image data of the second example shown in FIG. 9A (RGB+transparent image 210). Therefore, detailed description thereof is omitted herein.

The CMYKW ink amount data 250 of this example shown in FIG. 12B is the same as the CMYKW ink amount data 250 of the second example shown in FIG. 9B. Therefore, detailed description thereof is omitted herein.

FIG. 12D indicates CMYK values, expressed in 256 gradations ranging from 0 to 255, of the color information related to the CMYK values and W values, expressed in 256 gradations ranging from 0 to 255, of the color information of white (W) as the color information other than the CMYK values, with respect to the recording data of this example (CMYKW corrected ink amount data 420 in FIG. 10).

In the case where the recording data of this example shown in FIG. 12D is generated from the CMYKW ink amount data 250 shown in FIG. 12B, the ink amount correction data 340 shown in FIG. 12C is generated first using the third conversion table 330 shown in FIG. 11. Of the RGB+transparent image 210 shown in FIG. 12A, the transparency information related to the transparency degree X is converted using the third conversion table 330 so as to generate the ink amount correction data 340 shown in FIG. 12C. Subsequently, using the ink amount correction data 340 generated in this manner, the correcting operation 350 corrects the color information related to the CMYK values and the color information of W as the color other than the CMYK values included in the CMYKW ink amount data 250.

According to this example, color information related to RGB values and transparency information related to transparency degree can be easily converted to color information related to CMYK values and color information other than the CMYK values using the second conversion table and the third conversion table. That is, recording data that makes it possible to record a desired recording image can be easily generated.

The second conversion table is configured to convert the RGB values to the color information related to the CMYK values and the color information other than the CMYK values without using the transparency degree. This makes it possible for the second conversion table to be smaller than the first conversion table.

The entire disclosure of Japanese Patent Application No. 2013-179108, filed Aug. 30, 2013 is expressly incorporated by reference herein.

What is claimed is:

1. A recording data generation apparatus comprising:
a conversion table configured to convert RGB values to CMYK values and color information other than the CMYK values;
a CPU configured to generate recording data in CMYK form from image data in RGB form using the conversion table and correct the generated recording data in CMYK form, including both the CMYK values and the color information other than CMYK values, based upon transparency information related to a transparency degree, wherein the image data includes both the RGB values and the transparency information.

2. The recording data generation apparatus according to claim 1,
wherein the color information other than the CMYK values refers to information related to an amount of ink used in forming a base layer, and
the CMYK values refer to information related to an amount of ink used in forming a recording image upon the base layer based on the above-mentioned recording data.

3. The recording data generation apparatus according to claim 1,
wherein the CPU is configured to correct the color information other than the CMYK values without correcting the CMYK values by using the conversion table.

4. The recording data generation apparatus according to claim 1, wherein CPU if configured to correct both the CMYK values and the color information other than the the CMYK values separately by using the conversion table.

5. A recording data generation method comprising:
generating of recording data in CMYK form including CMYK values and color information other than the CMYK values based on image data in RGB form and a conversion table configured to convert RGB values to CMYK values and color information other than the CMYK values, wherein the image data includes both RGB values and transparency information related to a transparency degree; and correcting both the CMYK values and the color information other than the CMYK values of the generated recording data in CMYK form based upon the transparency information related to a transparency degree.

6. A recording apparatus comprising:

a configuration in which the recording apparatus is connected with the recording data generation apparatus according to claim 1.

7. A recording apparatus comprising:

a configuration in which the recording apparatus is connected with the recording data generation apparatus according to claim 2.

8. A recording data generation method comprising:

receiving image data in RGB form, the image data including both RGB values and transparency information;

generating recording data in CMYK form from the RGB values using a conversion table, the CMYK form comprising the CMYK values and the color information other than the CMYK values, and correcting both the CMYK values and the color information other than the CMYK values of the generated recording data in CMYK form based upon the transparency information and wherein the conversion table is configured to convert the RGB values to the CMYK values and the color information other than the CMYK values.

* * * * *